United States Patent
Yuan-Wu

(10) Patent No.: US 9,420,618 B2
(45) Date of Patent: Aug. 16, 2016

(54) METHOD OF COMMUNICATION IN AN ACCESS NETWORK WITH D2D COMMUNICATION, AND A CORRESPONDING BASE STATION, COMPUTER PROGRAM PRODUCT, AND DATA MEDIUM

(71) Applicant: Orange, Paris (FR)

(72) Inventor: Julie Yuan-Wu, Versailles (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/434,019

(22) PCT Filed: Oct. 8, 2013

(86) PCT No.: PCT/FR2013/052394
§ 371 (c)(1),
(2) Date: Apr. 7, 2015

(87) PCT Pub. No.: WO2014/057209
PCT Pub. Date: Apr. 17, 2014

(65) Prior Publication Data
US 2015/0257185 A1    Sep. 10, 2015

(30) Foreign Application Priority Data

Oct. 9, 2012 (FR) ...................... 12 59621

(51) Int. Cl.
*H04W 72/00* (2009.01)
*H04W 76/02* (2009.01)
(Continued)

(52) U.S. Cl.
CPC ............ *H04W 76/023* (2013.01); *H04W 28/18* (2013.01); *H04W 72/085* (2013.01); *H04W 72/04* (2013.01); *H04W 88/02* (2013.01); *H04W 88/08* (2013.01); *H04W 92/18* (2013.01)

(58) Field of Classification Search
CPC .................... H04W 72/0406; H04W 72/1284; H04W 76/023
USPC ........................................................ 455/452.2
See application file for complete search history.

(56) References Cited

U.S. PATENT DOCUMENTS

2010/0093364 A1   4/2010  Ribeiro et al.
2012/0020213 A1*  1/2012  Horneman .......... H04W 76/043
                                                               370/231
(Continued)

FOREIGN PATENT DOCUMENTS

WO   2011088609 A1   7/2011

OTHER PUBLICATIONS

International Search Report and Written Opinion dated Jan. 22, 2014 for corresponding International Application No. PCT/FR2013/052394, filed Oct. 8, 2013.

(Continued)

*Primary Examiner* — Thomas Lett
(74) *Attorney, Agent, or Firm* — David D. Brush; Westman, Champlin & Koehler, P.A.

(57) ABSTRACT

A communication method is provided, which is implemented by a base station of an access network in order to allocate spectrum resources among terminals identified by the station, the station having already allocated all of its spectrum resources to identified terminals having communication set up via the base station. These terminals determine a group of terminals. The method includes: verifying admissibility of a pair of terminals that are candidates for direct communication by determining a set of served terminals that are candidates for sharing their respective spectrum resources with the pair under the sole constraint of the candidate terminal and the pair satisfying their respective QoS criteria.

12 Claims, 3 Drawing Sheets

(51) Int. Cl.
   *H04W 28/18*   (2009.01)
   *H04W 72/08*   (2009.01)
   *H04W 72/04*   (2009.01)
   *H04W 92/18*   (2009.01)
   *H04W 88/02*   (2009.01)
   *H04W 88/08*   (2009.01)

(56) References Cited

U.S. PATENT DOCUMENTS

| | | | | |
|---|---|---|---|---|
| 2012/0243431 | A1* | 9/2012 | Chen | H04W 72/0406 370/252 |
| 2013/0051277 | A1* | 2/2013 | Hakola | H04W 76/023 370/254 |
| 2013/0229981 | A1* | 9/2013 | Park | H04W 72/0406 370/328 |
| 2013/0258996 | A1* | 10/2013 | Jung | H04W 72/1284 370/330 |

OTHER PUBLICATIONS

Mohammad Zulhasnine et al., "Efficient Resource Allocation for Device-to-Device Communication Underlying LTE , Network", Wireless and Mobile Computing, Networking and Communications (W-IMOB), 2010 IEEE 6th International Conference on, IEEE, Piscataway, NJ, USA, Oct. 11, 2010, pp. 368-375, XP031807946.

French Search Report and Written Opinion dated Jun. 12, 2013 for corresponding French Application No. 1259621, filed Oct. 9, 2012.

K. Doppler, M. Rinne, C. Wijting, C. Ribeiro, and K. Hugl, "Device-to-device communication as an underlay to lte-advanced networks", IEEE Commun. Mag., vol. 47, No. 12, pp. 42 49, 2009.

A. Gjendemsjo, D. Gesbert, G. Oien, and S. Kiani, "Optimal power allocation and scheduling for two-cell capacity maximization", in Proc. IEEE 4th Int. Symp. on Modeling and Optimization in Mobile, Ad Hoc and Wireless Networks, 2006, pp. 16.

Grinman, Alex. "The Hungarian Algorithm for Weighted Bipartite Graphs." 18.434: Seminar in Theoretical Computer Science, Apr. 30, 2015. Web. <<http://math.mit.edu/~rpeng/18434/hungarianAlgorithm.pdf, or at https://en.wikipedia.org/wiki/Hungarian_algorithm>>.

West, Douglas B: "Introduction" and "3.2 Algorithms and Applications". Introduction to Graph Theory. 2nd ed. Pearson Education, 2001. Print "Introduction", pp. 1-19 and "3.2 Algorithms and Applications", pp. 123-130.

English translation of the Written Opinion dated Sep. 4, 2015 for corresponding International Patent Application No. PCT/FR2013/052394, filed Oct. 8, 2013.

* cited by examiner

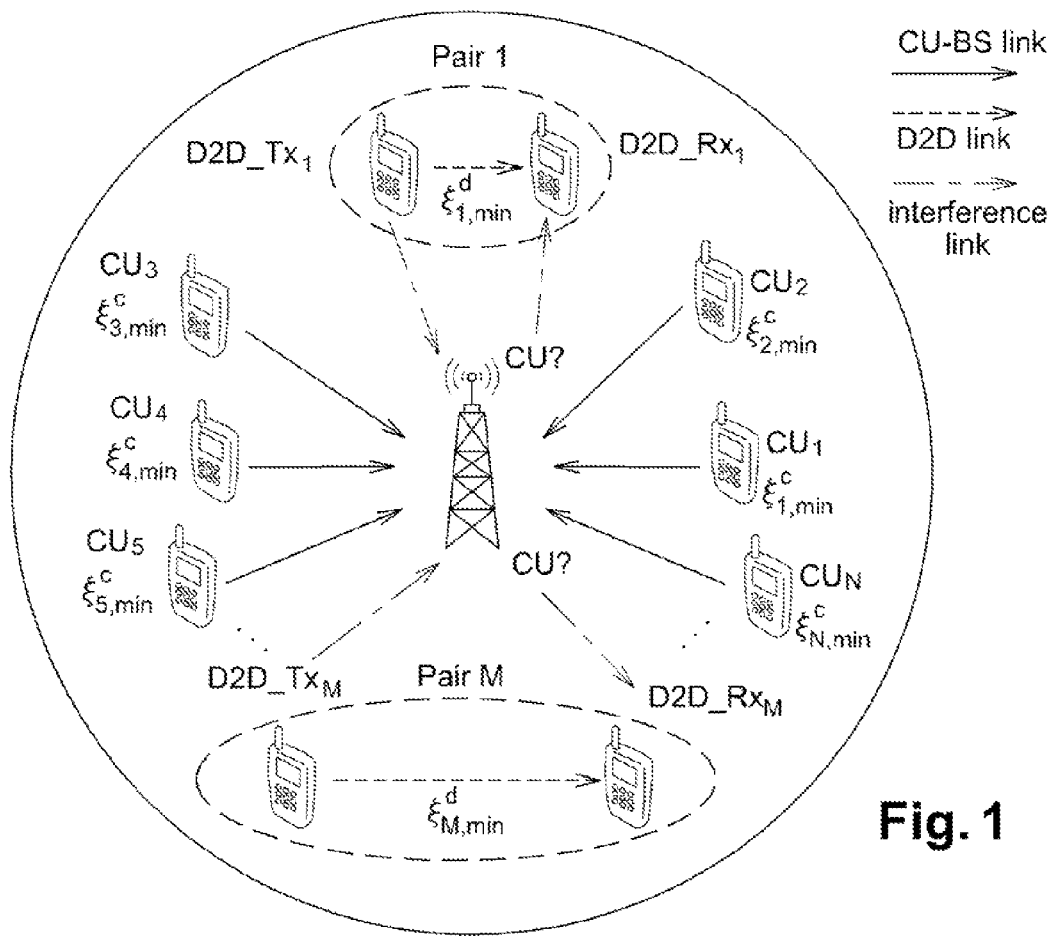
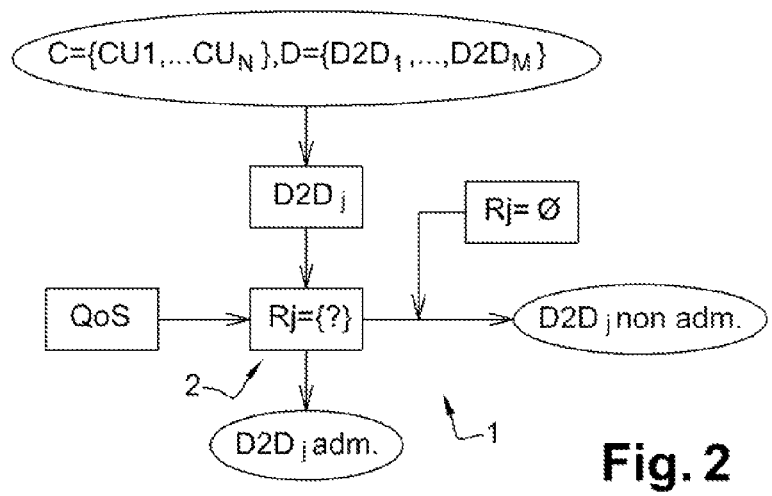
Fig. 1
Fig. 2

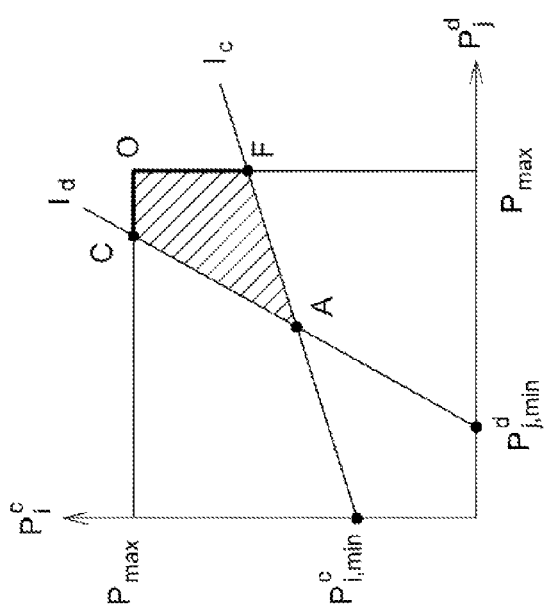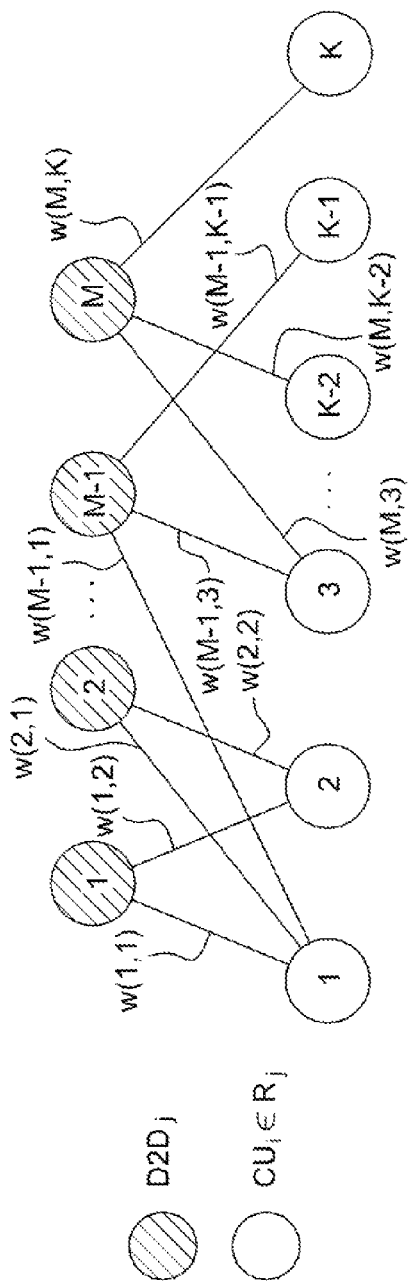

METHOD OF COMMUNICATION IN AN ACCESS NETWORK WITH D2D COMMUNICATION, AND A CORRESPONDING BASE STATION, COMPUTER PROGRAM PRODUCT, AND DATA MEDIUM

CROSS-REFERENCE TO RELATED APPLICATIONS

This Application is a Section 371 National Stage Application of International Application No. PCT/FR2013/052394, filed Oct. 8, 2013, the content of which is incorporated herein by reference in its entirety, and published as WO 2014/057209 on Apr. 17, 2014, not in English.

FIELD OF THE INVENTION

The present invention relates to the field of telecommunications. Within this field, the invention relates more particularly to access networks.

An access network to a telecommunications system comprises an access point that constitutes the interface between a terminal and the access network. In a cellular access network, sometimes referred to as a "mobile" network, the access point is commonly referred to as a "base station".

A mobile terminal seeking to set up communication with a destination must be identified with a base station and must request to be served by the base station. The base station can serve the terminal if it can allocate spectrum resource thereto.

Mobile access networks are confronted with increasing demand for communication capacity, thus leading to an increase in the load on base stations. When the base station has allocated all of its spectrum resource, it is fully loaded. It can no longer serve any new terminal until some of its spectrum resource has been released.

PRIOR ART

Recently, proposals have been made [1] to introduce the concept of direct to device (D2D) communication between two terminals within an access network. A pair of so-called D2D terminals thus communicates without passing via the base station. This requires both terminals to be in the proximity of each other within some maximum distance that is a function of the technology used for providing transmission.

Such direct communications are not without impact on communications established via the base station. Such communications generate interference, and more particularly on the communications of terminals that share the same spectrum resource.

These direct communications enable the total amount of communication to be increased beyond full load of the base station and thus makes it possible to improve the spectrum efficiency of the access network, however they can have an impact on communications being relayed via the base station since they generate interference that can reduce the signal to interference and noise ratio (SINR) and can thus reduce the quality of service (QoS) of the terminals being served by the base station.

Thus, the base station serves identified terminals in its coverage zone by allocating spectrum resource thereto, these terminals being referenced $CU_i$. The base station is assumed to be fully loaded even though identified pairs of terminals in its coverage waiting for spectrum resource are identified by the base station as being waiting pairs $D2D_j$.

In order to limit the impact of interference, a heuristic method is known [2] that can be performed by the base station. In the heuristic method, the base station orders a list of identified terminals $CU_s$, i.e. terminals to which the base station has allocated spectrum resource, in their order of decreasing channel gain ($g_{i,B}$). With consideration to the first terminal $CU_1$ in the list, the method then searches for a terminal pair $D2D_j$ to share the spectrum resource of the first terminal. The base station searches the set of waiting pairs $D2D_j$ for the pair having the smallest channel gain for the interference link $h_{1,j}$, which interference link is involved when the terminal $CU_1$ transmits to the base station and a terminal of the pair $D2D_j$ is receiving transmission from the other terminal of the pair. If the minimum SINR QoS criteria associated with both communications are satisfied, then the base station authorizes the terminal pair $D2D_j$ to share spectrum with the first terminal $CU_1$ and it eliminates this terminal pair $D2D_j$ from the set of waiting terminal pairs $D2D_j$. The method repeats the above steps for the second terminal $CU_2$. And so on for all of the waiting terminal pairs $D2D_j$ unless the algorithm stops on reaching the end of the list of terminals $CU_s$.

SUMMARY OF THE INVENTION

The invention proposes a technique for maximizing the overall data rate of the access network while guaranteeing a QoS both for the terminals served by a base station of the access network and for the terminal pairs that are authorized to communicate directly while sharing spectrum resource with the uplink of a served terminal.

The invention provides a communication method performed by a base station of an access network for allocating uplink spectrum resource among terminals identified by the station. Some such identified terminals to which the station has allocated all of its spectrum resource have communication passing via the base station. These terminals CU are said to be "served". The method comprises:

verifying admission of a pair $D2D_j$ of terminals that are candidates for direct communication, by determining a set of served terminals that are candidates for sharing their respective spectrum resources with the terminal pair $D2D_j$ under the sole constraint of the candidate terminal and the pair all satisfying their respective QoS criteria.

The base station SB knows which terminals are active in its radio coverage zone as a result of data exchanges in the signaling channel sometimes referred to as the return link. These terminals are said to be "identified". Generally, the base station identifies these terminals by recovering an identifier supplied by any terminal seeking to access the access network. Depending on the type of access network, the identifier may correspond for example to the mobile station international subscriber directory number (MSISDN), more commonly referred to as the telephone number. The base station also knows the destinations of communications requested by the various identified terminals. The base station is thus in a position to detect pairs of terminals that are situated in its coverage zone and that are seeking to set up communication with each other, and that are thus potentially capable of implementing communication directly without passing via the base station.

Advantageously, the station determines the set of all of the served terminals that are candidates for sharing their respective spectrum resources with a terminal pair $D2D_j$ while complying a QoS criterion both for the candidate terminal and for the terminal pair. The QoS criterion may be specified as a minimum SINR value for a given data rate.

Thus, the method determines all served terminals that are candidates for sharing their respective spectrum resources with a terminal pair. Unlike prior techniques, the method of the invention does not always make use of the candidate terminal that leads to the least interference for the signals received by the terminal pair capable of sharing the same spectrum resource, but instead determines a set of candidate terminals for which the QoS criterion is satisfied in spite of the disturbance that may be received by the terminal pair.

A terminal can be a candidate in the method only if the terminal pair satisfies its QoS criterion in spite of the disturbance to which the candidate terminal might give rise and only if the base station observes that the QoS criterion for the served terminal is satisfied. Thus, the method makes it possible to take one or more other criteria into account when selecting an optimum candidate terminal from the set of candidate terminals that enable an optimum overall data rate to be achieved, unlike prior techniques that may ignore certain candidates of greater potential from among the served terminals (a candidate of greater potential is a served terminal CU that can lead to a combined communication data rate for that served terminal and for the pair D2D under consideration that is greater than the combined data rate for the designated served terminal CU and the pair D2D under consideration while satisfying the QoS criteria under consideration).

If the set of candidate terminals is empty, then the terminal pair $D2D_j$ is not authorized to communicate directly and must wait and renew its request to set up communication with the base station at a later time. The base station has already allocated all of its spectrum resource so it cannot serve this pair of terminals, and in the absence of at least one terminal constituting a candidate for sharing its spectrum resource while complying with a QoS criterion, it cannot authorize any direct communication.

When there are a plurality of terminal pairs $D2D_j$ that are candidates for direct communication, admission verification may be performed for the various pairs of terminals. Verification then leads to as many sets of candidate terminals as there are terminal pairs for which admission is being verified.

In an implementation, the method further comprises, for an admissible pair $D2D_j$ and for each terminal $CU_i$ of the set for said pair, determining a pair of transmission powers associated respectively with the terminal $CU_i$ and with the pair $D2D_j$ such that the pair of transmission powers corresponds to the maximum combined data rates for the terminal $CU_i$ and for the pair $D2D_j$.

Thus, a method of the invention processes separately both the QoS constraint and also determining power levels for a candidate terminal and for the pair in order to achieve a maximum combined data rate. This operation makes it possible to simplify the initial problem of reaching an optimized overall data rate for communications served by the fully loaded base station and direct communications authorized with sharing of a spectrum resource that has already been allocated.

In a particular implementation, a terminal $CU_i$ forms part of the set if it satisfies the following system of equations:

$$\begin{cases} 0 \leq \dfrac{(g_j \xi^c_{i,min} + h_{j,B} \xi^c_{i,min} \xi^d_{j,min})\sigma^2_N}{g_j g_{i,B} - \xi^c_{i,min} \xi^d_{j,min} h_{i,j} h_{j,B}} \leq P_{max}, \\ 0 \leq \dfrac{(h_{i,j} \xi^c_{i,min} \xi^d_{j,min} + g_{i,B} \xi^d_{j,min})\sigma^2_N}{g_j g_{i,B} - \xi^c_{i,min} \xi^d_{j,min} h_{i,j} h_{j,B}} \leq P_{max}. \end{cases}$$

with:
$g_j$, the channel gain between the terminals of the pair $D2D_j$;
$g_{i,B}$, the channel gain between the terminal $CU_i$ and the base station over the uplink;
$h_{j,B}$, the channel gain of the interference link from the transmitter of the pair $D2D_j$ to the base station;
$h_{i,j}$, the channel gain of the interference link from a terminal $CU_i$ to the receiver of the pair $D2D_j$;
$\sigma_N$, the power of the additive Gaussian white noise on each channel;
$P_{max}$, the maximum transmission power of a terminal;
$\xi^d_{j,min}$ the minimum SINR level required by the pair $D2D_j$; and
$\xi^c_{i,min}$ the minimum SINR level required by a terminal $CU_i$.

The station thus determines the set of candidate terminals in deterministic manner.

The base station SB stores data characteristics of the identified terminals using known mechanisms that are deployed in access networks, such as in particular transmitting pilot signals that make it possible to determine the gain of a channel. The base station thus knows the channel gain between the terminals of a pair $D2D_j$, written $g_j$, i.e. when one of the terminals of the pair is transmitting and the other is receiving, the channel gain between the terminal $CU_i$ and the base station over the uplink, written $g_{i,B}$, i.e. when the terminal $CU_i$ is transmitting and the base station is receiving, the channel gain of the interference link from the transmitter of the pair $D2D_j$ to the base station, written $h_{j,B}$, i.e. when one of the terminals of the pair is transmitting to the other terminal of the pair while the base station is receiving a transmission from the terminal $CU_i$, the channel gain of the interference link from the terminal $CU_i$ to the receiver of the pair $D2D_j$, written $h_{i,j}$, i.e. when the terminal $CU_i$ is transmitting to the base station while one of the terminals of the pair is receiving a transmission from the other terminal of the pair, the power of the additive Gaussian white noise on each channel, written $\sigma_N$, the maximum transmission power of a terminal, written $P_{max}$, the minimum SINR level required for a pair $D2D_j$, written $\xi^d_{j,min}$, and the minimum SINR level required by a terminal $CU_i$, written $\xi^c_{i,min}$.

In a particular implementation, a terminal $CU_i$ belongs to the set $R_j$ if its distance from the receiver terminal of the terminal pair $D2D_j$ is greater than or equal to the distance determined by the following system of equations:

$$L^{min}_{i,jRx} = \begin{cases} \left[ \dfrac{K \xi^c_{i,min} \xi^d_{j,min} P_{max}}{(P_{max} g_{i,B} - \xi^c_{i,min} \sigma^2_N)} \\ \beta - \xi^c_{i,min} \xi^d_{j,min} \sigma^2_N \right]^{\frac{1}{\alpha}} & \text{if } \dfrac{P_{max} g_{i,B}}{\sigma^2_N + P_{max} h_{j,B}} \leq \xi^c_{i,min} \text{ or,} \\ \left[ \dfrac{K \xi^c_{i,min} \xi^d_{j,min}(\sigma^2_N + P_{max} h_{j,B})}{g_{i,B}(P_{max} g_j - \xi^d_{j,min} \sigma^2_N)} \right]^{\frac{1}{\alpha}} & \text{if } \dfrac{P_{max} g_{i,B}}{\sigma^2_N + P_{max} h_{j,B}} > \leq \xi^c_{i,min} \end{cases}$$

with: $\beta = \dfrac{g_j}{h_{j,B}}$ being the gain factor between the channel gain of the pair $D2D_j$ and the channel gain of the interference link from the transmitter of the pair $D2D_j$ to the base station, with $\alpha$ a propagation attenuation, and K a constant determined by parameters of the access network.

This implementation is particularly suitable when a propagation model is taken into account by the base station and when the propagation model is such that the channel gain between two entities $\underline{m}$ and $\underline{n}$ is given by the following equation: $g_{m,n} = K \cdot L_{m,n}^{-\alpha}$, with $\alpha$ being propagation attenuation and $\underline{k}$ being a constant determined by the parameters of the access network.

In a particular implementation, for a pair D2D$_j$, the method determines optimum pairs of transmission powers associated respectively with a candidate terminal CU$_i$ and the pair D2D$_j$, using the following system of equations:

$$(P_i^{c*}, P_j^{d*}) = \begin{cases} \arg\max_{(P_i^c, P_j^d) \in \mathcal{P}_1} f(P_i^c, P_j^d) & \text{if } \frac{P_{max} g_{i,B}}{\sigma_N^2 + P_{max} h_{j,B}} \leq \xi_{i,min}^c \text{ or} \\ \arg\max_{(P_i^c, P_j^d) \in \mathcal{P}_2} f(P_i^c, P_j^d) & \text{if } \frac{P_{max} g_{i,B}}{\sigma_N^2 + P_{max} h_{j,B}} > \xi_{i,min}^c \text{ and} \\ & \frac{P_{max} g_j}{\sigma_N^2 + P_{max} h_{i,j}} > \xi_{j,min}^d \text{ or} \\ \arg\max_{(P_i^c, P_j^d) \in \mathcal{P}_3} f(P_i^c, P_j^d) & \text{if } \frac{P_{max} g_{i,B}}{\sigma_N^2 + P_{max} h_{j,B}} > \xi_{i,min}^c \text{ and} \\ & \frac{P_{max} g_j}{\sigma_N^2 + P_{max} h_{i,j}} \geq \xi_{j,min}^d \end{cases}$$

with $\mathcal{P}_1 = \{(P_{max}, P_1), (P_{max}, P_2)\}$, $\mathcal{P}_2 = \{(P_3, P_{max}), (P_4, P_{max})\}$, $\mathcal{P}_3 = \{(P_{max}, P_1), (P_{max}, P_{max}), (P_4, P_{max})\}$, $P_1 = \dfrac{(\sigma_N^2 + P_{max} h_{i,j}) \xi_{j,min}^d}{g_j}$, $P_2 = \dfrac{P_{max} g_{i,B} - \xi_{i,min}^c \sigma_N^2}{\xi_{i,min}^c h_{j,B}}$, $P_3 = \dfrac{P_{max} g_j - \xi_{j,min}^d \sigma_N^2}{\xi_{j,min}^d h_{i,j}}$, $P_4 = \dfrac{(\sigma_N^2 + P_{max} h_{j,B}) \xi_{i,min}^c}{g_{i,B}}$, $f(P_i^c, P_j^d) = \log_2(1 + \xi_i^c) + \log_2(1 + \xi_j^d)$ is the function that sums the respective data rates of a candidate terminal and the terminal pair D2D$_j$.

This implementation makes it simple to determine the optimum power pairs that maximize the combined communication data rate for the candidate terminal and for the direct communication of the pair.

In an implementation, the method further includes determining the optimum terminal of a set that complies with a local data rate criterion.

This method is more particularly suitable when there is only one admissible terminal pair D2D$_j$ or when there are a plurality of admissible terminal pairs for which the sets of candidate terminals are disjoint.

From a set of candidate terminals, the method determines the optimum candidate relative to a pair, i.e. the candidate that complies with a local data rate criterion. This local data rate criterion corresponds to increasing the data rate between firstly the combination of the data rates achieved by the terminal and by the terminal pair, and secondly the data rate achieved by the terminal in the absence of sharing its spectrum resource with the terminal pair; this optimum candidate relative to the pair thus makes it possible to achieve the greatest improvement in local data rate.

This mode thus makes it possible to authorize direct communication between the terminals of an admissible pair while ensuring an optimum data rate for the network by determining, from among the candidate terminals after verifying admission, that candidate terminal which optimizes a local data rate criterion.

In a particular implementation, the optimum terminal is determined for all of the disjoint sets. This implementation is particularly suitable for situations in which there are a plurality of admissible terminal pairs for which some of the sets of candidate terminals are disjoint.

In a particular implementation, the method further comprises jointly determining terminals of sets that make it possible to maximize an increase in local data rate by means of a weight optimization algorithm.

This implementation is more particularly suitable for situations in which there are a plurality of admissible terminal pairs for which some of the sets of candidate terminals are not disjoint. Under such circumstances, determining an optimum terminal for a pair under the sole constraint of complying with a local data rate criterion can lead to difficulty if a single terminal should be found simultaneously to be the optimum terminal for another pair.

Consequently, in this implementation, the method makes use of a weight optimization algorithm known to the person skilled in the art. Such an algorithm is generally based on a bipartite graph. The bipartite graph then presents each terminal pair D2D$_j$ on one row, and the candidate terminals on another row facing the first row. A link is drawn between a pair and a terminal when the terminal is a candidate for sharing resource with the pair. The improvement in data rate, which is the difference between firstly the maximum combined data rate achieved by the terminal and by the pair while sharing the resource and secondly the maximum data rate achieved by the terminal in the absence of resource sharing, is considered as being the weight associated with the link on the graph between the terminal and the terminal pair D2D$_j$.

Such an algorithm makes it possible to determine the optimum terminals, i.e. the terminals for which the improvement in overall data rate for the access network is maximized, i.e. over the set constituted by communications passing via the base station and communication passing directly between the terminals of the pair, while maximizing the increases in data rate.

In a particular implementation, the joint determination is performed group of non-disjoint sets by group of non-disjoint sets, i.e. the disjoint sets are excluded from groups of non-disjoint sets. As far as possible, a group of non-disjoint sets does not include a set or another group that can be disjoint from the group.

The invention also provides a base station adapted to implement a communication method of the invention.

The invention also provides an access network including at least one base station of the invention.

The invention also applies to a computer program, in particular a computer program on or in a data medium and adapted to perform the invention. The program may use any programming language, and be in the form of source code, object code, or code intermediate between source code and object code, such as in a partially compiled form, or in any other form that is desirable for implementing a method of the invention.

The data medium may be any entity or device capable of storing the program. For example, the medium may comprise storage means such as a read only memory (ROM), e.g. a compact disk (CD) ROM or a microelectronic circuit ROM, or indeed magnetic recording means such as a floppy disk or a hard disk.

Alternatively, the data medium may be an integrated circuit in which the program is incorporated, the circuit being adapted to execute or to be used in the execution of the method in question.

Furthermore, the program may be converted into a transmissible form such as an electrical or optical signal suitable for being conveyed via an electrical or optical cable, by radio, or by other means. The program of the invention may in particular be downloaded from an Internet type network.

LIST OF FIGURES

Other characteristics and advantages of the invention appear from the following description of examples given as non-limiting examples, which description is made with reference to the following accompanying figures.

FIG. 1 is a diagram of an access network with a base station and terminals identified by the station.

FIG. 2 is a flow chart of an implementation of a method of the invention.

Figure 4A:
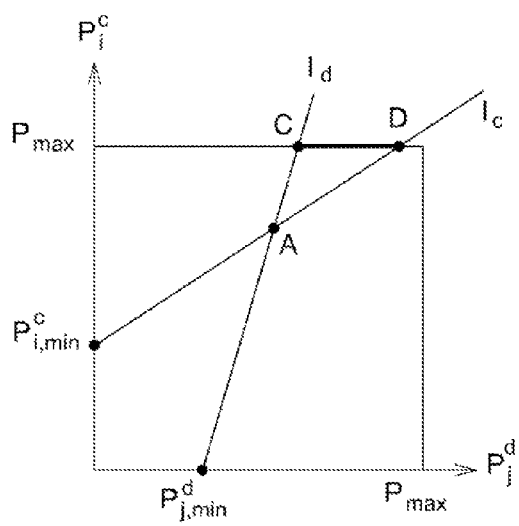
Figure 4B:
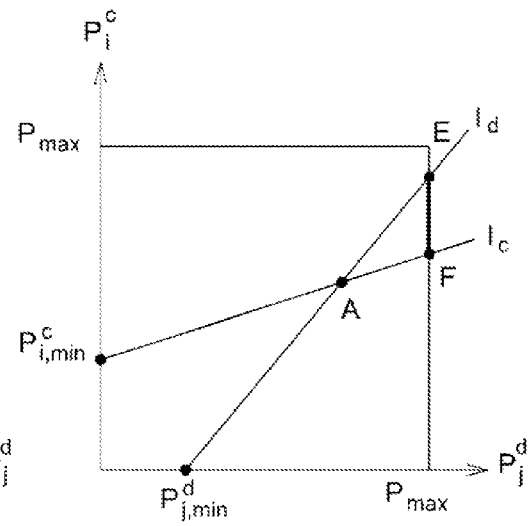

FIGS. 4a, 4b, and 4c show three different situations for the admissibility zone for candidate terminals for sharing resource with the pair $D2D_j$.

FIG. 5 is a bipartite graph for an optimization algorithm applied to the union of all candidate terminals and the corresponding pairs $D2D_j$.

DESCRIPTION OF IMPLEMENTATIONS OF THE INVENTION

An access network is shown in FIG. 1. For simplification purposes, only one base station SB is shown, however the access network could have other base stations.

The coverage zone is represented very diagrammatically by a circle centered on the base station. Naturally, in reality, the outline of this zone depends on the surroundings, and the surroundings have an influence in particular on propagation conditions, and thus on range in any given direction. The terminals identified by the base station are shown as being distributed more or less regularly around the base station. Naturally, this representation is used for illustrative purposes and in reality the distribution is totally random.

An identified terminal has spectrum resource allocated thereto by the base station for setting up communication relayed by the station, where such a station is written $CU_i$ and is said to be served. Nevertheless, when the base station has allocated all of its spectrum resource, it is fully loaded and it can no longer serve an identified terminal requesting communication setup. During the request to set up communication, the base station has knowledge of the identifier of the destination.

By making a comparison with a list of terminals identified in its own coverage zone, the base station can determine whether the destination forms part of that list. Thus, the base station can identify terminal pairs $D2D_j$ that might be able to set up communication directly.

In the diagram of FIG. 1, continuous arrows represent uplinks from the terminal $CU_i$ that have had spectrum resource allocated thereto by the base station. Dashed-line arrows represent direct communication between respective terminal pairs $D2D_j$. Dotted-line arrows represent interference links. $C=\{CU_1, CU_2, \ldots, CU_i, \ldots, CU_N\}$ is the set of terminals $CU_i$ identified by the station to which spectrum resource has been allocated. $D=\{D2D_1, D2D_2, \ldots, D2D_j, \ldots, D2D_M\}$ is the set of terminal pairs $D2D_j$ identified by the station.

A communication method of the invention then enables the base station to authorize direct communication between the terminals of a pair $D2D_j$ even though the base station is fully loaded, providing certain constraints are complied with. In particular, the authorization is constrained to satisfy simultaneously a QoS criterion for the served terminal and for the pair authorized to transmit directly. Naturally, this QoS criterion is associated with the communication via the base station or with the direct communication; it may have different values for the served terminal and for the pair of terminals.

The method thus begins by examining whether a pair $D2D_j$ is admissible. This pair is found to be admissible is determined solely if it is possible to satisfy a QoS criterion constraint for each of the communications of the served terminal and of the pair $D2D_j$. At the end of admissibility verification, the pair is determined as being admissible or not admissible. The pair is admissible if at least one served terminal enables the QoS criterion to be satisfied. This terminal is said to be the candidate terminal, and $R_j$ is the set of candidate terminals for the pair $D2D_j$.

The QoS criterion may correspond to some minimum level of SINR. It may have some other form, e.g. a minimum SINR level guaranteed with a probability of X % (where X may be 99, for example).

If the set $R_j$ of served terminals $CU_i$ that are candidates for sharing their respective uplink spectrum resources with the pair of terminals is empty, then the terminal pair $D2D_j$ is not admissible and is therefore not authorized to set up direct communication since there is no candidate terminal for sharing its spectrum resource.

The method sets out to authorize uplink spectrum resource sharing of relayed communications, since interference on this link has an impact solely on the base station.

Propagation loss is assumed to be dominated by Gaussian white noise that is additive. The additive Gaussian white noise on each channel is then written $\sigma_N^2$.

The base station then has knowledge of the following information, e.g. by recovering data exchanged in the signaling channel during the identification stage or subsequently when requesting communication setup:

$g_j$, the channel gain between the terminals of a pair $D2D_j$;

$g_{i,B}$, the channel gain between the terminal $CU_i$ and the base station;

$h_{j,B}$, the channel gain of the interference links between the transmitter $D2D\_Tx_j$ of the pair $D2D_j$ to the base station, which channel is involved when a terminal of the pair transmits to the other terminal of the pair while the base station is receiving transmission from the terminal $CU_i$;

$h_{ij}$, the gain of the interference link channel from a terminal $CU_i$ to the receiver $D2T\_Rx_j$ of the pair $D2D_j$, which channel is involved when the terminal $CU_i$ is transmitting to the base station (i.e. over the uplink) while a terminal of the pair is receiving transmission from the other terminal of the pair;

$P_{max}$, the maximum transmission power of a terminal;

$\xi_{j,min}^d$ the minimum SINR level required by a pair $D2D_j$; and $\xi_{i,min}^c$ the minimum SINR level required by a terminal $CU_i$.

The transmission power of the terminal $CU_i$ is written $P_i^c$, the transmission power of the pair $D2D_j$ (i.e. the transmitter of the pair) is written $P_j^d$.

A method of the invention is described in detail below and is illustrated by the flow chart shown in FIG. 2.

The method 1 comprises verifying 2 admission of a pair $D2D_j$ of terminals that are candidates for direct communication. Admission verification comprises:

determining a set $R_j$ of served terminals $CU_i$ that are candidates for sharing their respective spectrum resources with the terminal pair $D2D_j$. A served terminal $CU_i$ forms part of the set $R_j$ if the terminal and the pair satisfy their respective QoS criteria.

In an implementation, the QoS criterion corresponds to a minimum SINR level. In a particular implementation, a served terminal $CU_i$ belongs to the set $R_j$ if that terminal and the pair $D2D_j$ satisfy the following system of equations:

$$\begin{cases} 0 \leq \dfrac{(g_j \xi^c_{i,min} + h_{j,B} \xi^c_{i,min} \xi^d_{j,min}) \sigma^2_N}{g_j g_{i,B} - \xi^c_{i,min} \xi^d_{j,min} h_{i,j} h_{j,B}} \leq P_{max}, \\ 0 \leq \dfrac{(h_{i,j} \xi^c_{i,min} \xi^d_{j,min} + g_{i,B} \xi^d_{j,min}) \sigma^2_N}{g_j g_{i,B} - \xi^c_{i,min} \xi^d_{j,min} h_{i,j} h_{j,B}} \leq P_{max}. \end{cases} \quad (9)$$

Admitting a pair $D2D_j$ for sharing resource with a terminal of the set $R_j$ while complying with the respective SINRs and while optimizing the overall throughput of the access network can be formulated by the following system of equations:

$$\max_{\rho_{i,j}, P^c_i, P^d_j} \left\{ \sum_{i \in C} \log_2(1 + \xi^c_i) + \sum_{j \in S} \log_2(1 + \xi^d_j) \right\} \quad (2a)$$

under the following constraints:

$$\xi^c_i = \frac{P^c_i g_{i,B}}{\sigma^2_N + \rho_{i,j} P^d_j h_{j,B}} \geq \xi^c_{i,min}, \forall i \in C, \quad (2b)$$

$$\xi^d_j = \frac{P^d_j g_j}{\sigma^2_N + \rho_{i,j} P^c_i h_{i,j}} \geq \xi^d_{j,min}, \forall j \in S, \quad (2c)$$

$$\rho_{i,j} \in \{0, 1\}, \sum_j \rho_{i,j} \leq 1, \forall i \in C, \quad (2d)$$

$$\rho_{i,j} \in \{0, 1\}, \sum_i \rho_{i,j} \leq 1, \forall j \in S, \quad (2e)$$

$$P^c_i \leq P_{max}, \forall i \in C, \quad (2f)$$

$$P^d_j \leq P_{max}, \forall j \in S, \quad (2g)$$

where $S (S \subseteq D)$ is the set of admissible pairs $D2D_j$, $\rho_{i,j}$ is a resource re-utilization indicator between a terminal $CU_i$ and a pair $D2D_j$: $\rho_{i,j}=1$ when the pair $D2D_j$ uses the resource of the terminal $CU_i$, else $\rho_{i,j}=0$. Equation (2d) corresponds to the constraint that the resource of a terminal $CU_i$ is shared not more than once and with only one pair of terminals. Equation (2e) corresponds to the constraint that a terminal pair $D2D_j$ shares the resource with not more than one terminal $CU_i$.

A terminal pair $D2D_j$ is admissible (j∈S) for sharing the resource of a terminal $CU_i$ only if their respective QoS requirements expressed in SINR levels are satisfied. These constraints are verified if:

$$\begin{cases} \xi^c_i = \dfrac{P^c_i g_{i,B}}{\sigma^2_N + P^d_j h_{j,B}} \geq \xi^c_{i,min} \\ \xi^d_j = \dfrac{P^d_j g_j}{\sigma^2_N + P^c_i h_{i,j}} \geq \xi^d_{j,min} \\ P^c_i \leq P_{max}, P^d_j \leq P_{max}, \end{cases} \quad \begin{array}{c} (3a) \\ (3b) \\ (3c) \end{array}$$

The SINR of a terminal $CU_i$ that does not share its spectrum resource with a pair $D2D_j$ is satisfied if this terminal is transmitting with a minimum power given by:

$$P^c_{i,min} = \frac{\xi^c_{i,min} \sigma^2_N}{g_{i,B}} \quad (4)$$

The SINR of a pair $D2D_j$ is satisfied in the absence of interference by transmitting at a minimum power given by:

$$P^d_{j,min} = \frac{\xi^d_{j,min} \sigma^2_N}{g_j} \quad (5)$$

Figure 3A:
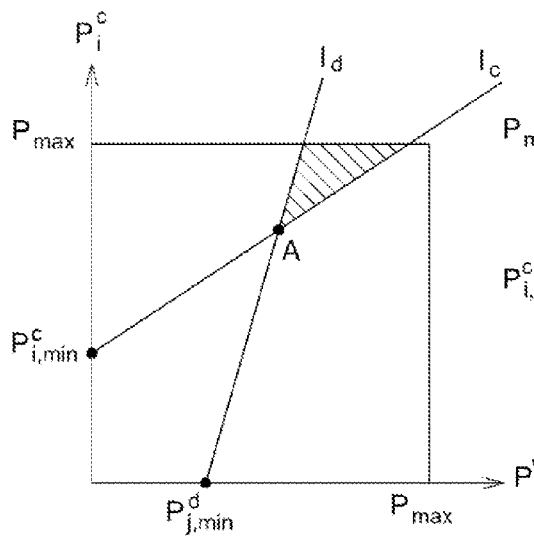
FIGS. 3a and 3b are diagrams showing the constraints imposed by QoS criteria.
Figure 3B:
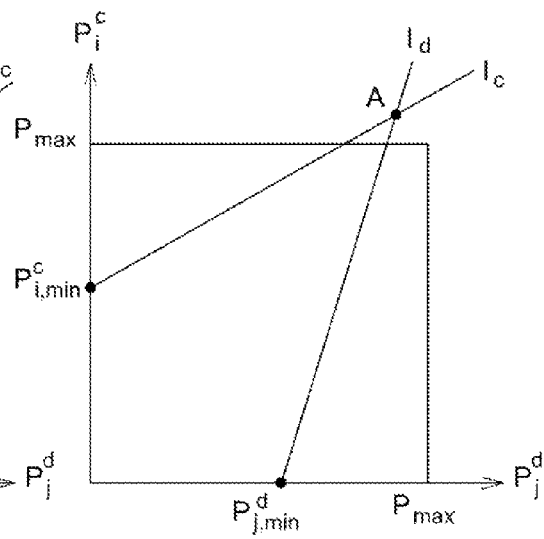

FIGS. 3a and 3b are diagrams showing the constraints imposed by equations (3a), (3b), (3c), (4), and (5). The lines $L_c$ and $L_d$ correspond to equations (3a) and (3b) when $\xi^c_i = \xi^c_{i,min}$ and $\xi^d_j = \xi^d_{j,min}$. The existence of terminals $CU_i$ in the set $R_j$ is represented by the existence of a shaded zone, referred to as the admissible zone, such that the pair of powers $(P^c_i, P^d_j)$ in this zone satisfy equations (3a), (3b), and (3c) simultaneously. FIG. 3a corresponds to the situation where the admissible zone is not empty, and FIG. 3b corresponds to the situation where the admissible zone is empty since there is no pair of powers that makes it possible to satisfy the constraints formulated by equations (3a), (3b), and (3c), (4), and (5) simultaneously.

In order for the admissible zone not to be empty it is necessary and sufficient for the point of intersection A between the lines $L_c$ and $L_d$ to lie within the square $P_{max}$-$P_{max}$. This requires the slope of the line $L_d$ to be greater than the slope of the line $L_c$:

$$\frac{\xi^c_{i,min} h_{j,B}}{g_{i,B}} < \frac{g_j}{\xi^d_{j,min} h_{i,j}} \quad (6)$$

The coordinates of the point A serve to determine the minimum transmission power for the terminal $CU_i$ and the minimum transmission power for the pair $D2D_j$ in order to comply with the respective minimum SINR constraints.

$$\begin{cases} \dfrac{P^c_i g_{i,B}}{\sigma^2_N + P^d_{j,A} h_{j,B}} = \xi^c_{i,min}, \\ \dfrac{P^d_{j,A} g_j}{\sigma^2_N + P^c_{i,A} h_{i,j}} = \xi^d_{j,min}. \end{cases} \quad (7)$$

This leads to:

$$\begin{cases} P^c_{i,A} = \dfrac{(g_j \xi^c_{i,min} + h_{j,B} \xi^c_{i,min} \xi^d_{j,min}) \sigma^2_N}{g_j g_{i,B} - \xi^c_{i,min} \xi^d_{j,min} h_{i,j} h_{j,B}}, \\ P^d_{j,A} = \dfrac{(h_{i,j} \xi^c_{i,min} \xi^d_{j,min} + g_{i,B} \xi^d_{j,min}) \sigma^2_N}{g_j g_{i,B} - \xi^c_{i,min} \xi^d_{j,min} h_{i,j} h_{j,B}}, \end{cases} \quad (8)$$

For the set $R_j$ not to be empty, i.e. for the pair $D2D_j$ to be admissible, it is therefore necessary for at least one pair $(P^c_{i,A}, P^d_{j,A})$ to lie between $(0,0)$ $(P_{max}, P_{max})$, with $P^c_{i,A}$ being the power of a potential candidate terminal $CU_i$ that corresponds to the system of equations (9).

When the set S contains a plurality of pairs, the method verifies admission for each pair as explained above.

In a particular implementation, the channel gain between an identified terminal and the base station may be expressed in the form:

$$g_{i,B} = K \cdot L_{i,B}^{-\alpha} \quad (1)$$

with K a constant determined by parameters of the access network, $\alpha$ the propagation attenuation, and $L_{i,B}$ the distance between the identified terminal $CU_i$ and the base station. This distance may be determined by various known methods, such as for example making use of the GPS coordinates of the terminals. A served terminal $CU_i$ belongs to the set $R_j$ if its distance $L_{i,jRx}$ to the receiver of the pair $D2D_j$ is greater than or equal to the minimum distance:

$$L_{i,jRx}^{min} = \qquad (10)$$

$$\begin{cases} \left[ \dfrac{K\xi_{i,min}^c \xi_{j,min}^d P_{max}}{(P_{max}g_{i,B} - \xi_{i,min}^c \sigma_N^2)\beta - \xi_{i,min}^c \xi_{j,min}^d \sigma_N^2} \right]^{\frac{1}{\alpha}} & \text{if } \dfrac{P_{max}g_{i,B}}{\sigma_N^2 + P_{max}h_{j,B}} \le \xi_{i,min}^c, \\[2ex] \left[ \dfrac{K\xi_{i,min}^c \xi_{j,min}^d (\sigma_N^2 + P_{max}h_{j,B})}{g_{i,B}(P_{max}g_j - \xi_{j,min}^d \sigma_N^2)} \right]^{\frac{1}{\alpha}} & \text{if } \dfrac{P_{max}g_{i,B}}{\sigma_N^2 + P_{max}h_{j,B}} > \xi_{i,min}^c, \end{cases}$$

where $$\beta = \frac{g_j}{h_{j,B}}$$

represents the gain factor between the channel gain of the pair $D2D_j$ and the channel gain of the interference link from the transmitter of the pair $D2D_j$ to the base station. As shown in Appendix A, the constraints imposed by equation (9) can be written in the form (10) by taking account of equation (1). All of the channel gains contained in equations (9) and (10) can also be obtained using equation (1), providing the respective associated distances are known, thus presenting the advantage of not requiring any operation of measuring these gains.

The following conduct of the method is particularly appropriate when the previously determined sets $R_j$ are disjoint.

Thus, for a given terminal pair, the method determines 4 transmission power pairs associated with the terminals of the set $R_j$ and with the admissible pair maximizing a data rate criterion. Maximizing the overall data rate of the access network, i.e. both of communication via the base station and direct communication, is expressed by equation (2a). Given that the sets $R_j$ are disjoint, maximizing the overall data rate amounts to maximizing for each pair $D2D_j$ the sum of the data rates associated respectively with the candidate terminals $CU_i$ under consideration and with the terminal pair $D2D_j$.

In an implementation, the power pairs that enable this maximization to be performed to satisfy the following equation:

$$(P_i^{c*}, P_j^{d*}) \arg\max_{P_i^c, P_j^d} \{\log_2(1 + \xi_i^c) + \log_2(1 + \xi_j^d)\}, \qquad (11)$$

under the constraints of equations (3a) to (3c).

Returning to FIG. 3a, it is possible to distinguish three different situations for the admissibility zone as shown respectively in FIGS. 4a to 4c. Given that all of the power pairs belonging to the admissibility zone satisfy the constraints (3a) to (3c), the optimum power pairs, i.e. those that lead to maximizing the overall data rates, lie on the lines drawn in bold in FIGS. 4a-4c, as explained in Appendix B. The pairs belonging to those lines satisfy one of the equations of the following system, which equations correspond to the three situations respectively:

$$(P_i^{c*}, P_j^{d*}) = \qquad (12)$$

$$\begin{cases} \arg\max_{(P_i^c, P_j^d) \in \mathcal{P}_1} f(P_i^c, P_j^d) & \text{if } \dfrac{P_{max}g_{i,B}}{\sigma_N^2 + P_{max}h_{j,B}} \le \xi_{i,min}^c \\[2ex] \arg\max_{(P_i^c, P_j^d) \in \mathcal{P}_2} f(P_i^c, P_j^d) & \text{if } \dfrac{P_{max}g_{i,B}}{\sigma_N^2 + P_{max}h_{j,B}} > \xi_{i,min}^c \text{ and } \dfrac{P_{max}g_j}{\sigma_N^2 + P_{max}h_{i,j}} > \xi_{j,min}^d \\[2ex] \arg\max_{(P_i^c, P_j^d) \in \mathcal{P}_3} f(P_i^c, P_j^d) & \text{if } \dfrac{P_{max}g_{i,B}}{\sigma_N^2 + P_{max}h_{j,B}} > \xi_{i,min}^c \text{ and } \dfrac{P_{max}g_j}{\sigma_N^2 + P_{max}h_{i,j}} > \xi_{j,min}^d \end{cases}$$

with:

$\mathcal{P}_1 = \{(P_{max}, P_1), (P_{max}, P_2)\}$ $\mathcal{P}_2 = \{(P_3, P_{max}), (P_4, P_{max})\}$ $\mathcal{P}_3 = \{(P_{max}, P_1), (P_{max}, P_{max}), (P_4, P_{max})\}$ $$P_1 = \frac{(\sigma_N^2 + P_{max}h_{i,j})\xi_{j,min}^d}{g_j}$$

$$P_2 = \frac{P_{max}g_{i,B} - \xi_{i,min}^c \sigma_N^2}{\xi_{i,min}^c h_{j,B}}$$

$$P_3 = \frac{P_{max}g_j - \xi_{j,min}^d \sigma_N^2}{\xi_{j,min}^d h_{i,j}}$$

$$P_4 = \frac{(\sigma_N^2 + P_{max}h_{j,B})\xi_{i,min}^c}{g_{i,B}}$$

In an implementation, in order to decide between the various candidate terminals for resource sharing and in order to determine the optimum terminal $CU_i$ that is to share its resource, the criterion takes a local data rate criterion into consideration.

The maximum data rate for a candidate terminal $CU_i$ ($i \in R_j$) in the absence of its resource being shared is:

$$T_{i,max} = \log_2\left(1 + \frac{P_{max}g_{i,B}}{\sigma_N^2}\right) \qquad (13)$$

When it shares this resource with a pair $D2D_j$, the maximum sum data rate $T_{i,j}^{sum}$ may be expressed as follows:

$$T_{i,j}^{sum} = \log_2\left(1 + \frac{P_i^{c*}g_{i,B}}{P_j^{d*}h_{j,B} + \sigma_N^2}\right) + \log_2\left(1 + \frac{P_j^{d*}g_j}{P_i^{c*}h_{i,j} + \sigma_N^2}\right), \qquad (14)$$

with $(P_i^{c*}, P_j^{d*})$ being given by the equation system (12). Thus, the improvement in data rate with a pair $D2D_j$ can be expressed as follows:

$$T_{i,j}^G = T_{i,j}^{sum} - T_{i,max}. \qquad (15)$$

Consequently, the optimum candidate terminal for resource sharing with the pair $D2D_j$ is the terminal that corresponds to:

$$i^* = \underset{i \in R_j}{\mathrm{argmax}}\, T_{i,j}^G. \tag{16}$$

i.e. the terminal that leads to a maximum increase in local data rate.

The following conduct of the method is more particularly adapted for sets $R_j$ that are not disjoint. Under such circumstances, a search for the maximum local rate data cannot be undertaken separately among the admissible pairs $D2D_j$ for which the sets $R_j$ are not disjoint, the search for optimum candidate terminals amounts to solving the following system:

$$\underset{i \in C', j \in S}{\max}\, \rho_{i,j} T_{i,j}^G,$$

under the constraints:

$$\sum_j \rho_{i,j} \le 1,\, \rho_{i,j} \in \{0,1\},\, \forall i \in C', \tag{17}$$

where C' is the union of all of the candidate terminals of all of the pairs $D2D_j$ or of pairs $D2D_j$ to which the sets $R_j$ are not disjoint.

The method uses a weight optimization algorithm such as that described in [3] in order to solve the system of equations (17). Such an algorithm is based on a bipartite graph as shown in FIG. 5. The top row represents the various pairs $D2D_j$. The bottom row represents the candidate terminals. The set of pairs and the set of candidate terminals are considered as being vertex groups for the bipartite graph. The vertex i is connected by a link ij to the vertex j when the terminal j belongs to the set $R_j$ of the pair $D2D_j$. The improvement in local data rate, $T_{i,j}^G$ is considered as being the weight of the link ij.

For simplification purposes, the above description assumes that the maximum transmission power $P_{MAX}$ is identical for all of the transmitters of the terminal. It is easy for the person skilled in the art to adapt the various equations so as to take account of a respective maximum transmission power for reach receiver k: $P_{k,MAX}$ in order to take account for example of different states of charge in the batteries of the transmitters k.

Assuming that the value of the minimum signal to interference plus noise ratio that is taken into account in the above equations is not the true minimum SINR value but a weighted value of the true minimum SINR value using the ratio $a_k = P_{MAX}/P_{k,MAX}$ (i.e. the true values are expressed in the form:

$$\left( \frac{\xi_{i,min}^c}{\alpha_i}, \frac{\xi_{j,min}^d}{\alpha_j} \right),$$

then the equations remain unchanged and the weighting needs to be taken into account only during transmission by transmitter k. The power determined by the system of equations (12) needs to divided by the weighting coefficient $a_k$ in order to obtain the power at which the transmitter k is to transmit.

Although the implementations are described in detail above on the basis of examples relating to a cellular network, the invention can be used equally well in the context of a wireless network, e.g. of the WiFi type. Under such circumstances, the base station is more commonly referred to as an "access point".

REFERENCES

[1] K. Doppler, M. Rinne, C. Wijting, C. Ribeiro, and K. Hugl, "Device-to-device communication as an underlay to lte-advanced networks", IEEE Commun. Mag., Vol. 47, No. 12, pp. 42-49, 2009.

[2] M. Zulhasnine, C. Huang, and A. Srinivasan, "Efficient resource allocation for device-to-device communication underlaying lte network", in Proc. IEEE 6th Int. Conf. on Wireless and Mobile Computing, Networking and Commun. (WiMob' 2010), 2010, pp. 368-375.

[3] D. West et al., Introduction to graph theory. Upper Saddle River, N.J.: Prentice Hall, 2001.

[4] A. Gjendemsjo, D. Gesbert, G. Oien, and S. Kiani, "Optimal power allocation and scheduling for two-cell capacity maximization", in Proc. IEEE 4th Int. Symp. on Modeling and Optimization in Mobile, Ad Hoc and Wireless Networks, 2006, pp. 1-6.

APPENDIX A

If the pair $D2D_j$ is admissible for sharing resource with the terminal $CU_i$, then constraint (9) must be satisfies. The two inequalities of (9) make it possible to write:

$$h_{i,j} \le \begin{cases} \dfrac{P_{max} g_{i,B} g_j - \sigma_N^2 (\xi_{i,min}^c g_j - \xi_{i,min}^c \xi_{j,min}^d h_{j,B})}{\xi_{i,min}^c \xi_{j,min}^d P_{max} h_{j,B}} \equiv h_{i,j}^c, \\ \dfrac{P_{max} g_{i,B} g_j - \xi_{j,min}^d g_{i,B} \sigma_N^2}{\xi_{i,min}^c \xi_{j,min}^d (\sigma_N^2 + P_{max} h_{j,B})} \equiv h_{i,j}^d, \end{cases} \tag{A.1}$$

Thus:

$$h_{i,j} \le \min\{h_{i,j}^c, h_{i,j}^d\}. \tag{A.2}$$

By comparing $h_{i,j}^c$ and $h_{i,j}^d$ the following is obtained:

$$h_{i,j} \le \begin{cases} h_{i,j}^c, & \text{if } \dfrac{P_{max} g_{i,B}}{\sigma_N^2 + P_{max} h_{j,B}} \le \xi_{i,min}^c, \\ h_{i,j}^d, & \text{if } \dfrac{P_{max} g_{i,B}}{\sigma_N^2 + P_{max} h_{j,B}} > \xi_{i,min}^c. \end{cases} \tag{A.3}$$

By substituting channel model corresponding to equation (1) in (A.3), the following is obtained:

$$L_{i,jRx} \ge \begin{cases} \left[ \dfrac{K \xi_{i,min}^c \xi_{j,min}^d P_{max}}{(P_{max} g_{i,B} - \xi_{i,min}^c \sigma_N^2)\beta - \xi_{i,min}^c \xi_{j,min}^d \sigma_N^2} \right]^{\frac{1}{\alpha}} & \text{if } \dfrac{P_{max} g_{i,B}}{\sigma_N^2 + P_{max} h_{j,B}} \le \xi_{i,min}^c, \\ \left[ \dfrac{K \xi_{i,min}^c \xi_{j,min}^d (\sigma_N^2 + P_{max} h_{j,B})}{g_{i,B}(P_{max} g_j - \xi_{j,min}^d \sigma_N^2)} \right]^{\frac{1}{\alpha}} & \text{if } \dfrac{P_{max} g_{i,B}}{\sigma_N^2 + P_{max} h_{j,B}} > \xi_{i,min}^c, \end{cases} \tag{A.4}$$

APPENDIX B

According to [4], for a power pair $(P_i^c, P_j^d)$ under consideration within the admissible zone, there always exists another power pair $(\lambda P_i^c, \lambda P_j^d)(\lambda > 1)$ in the admissible zone such that:

$$f(\lambda P_i^c, \lambda P_j^d) > f(P_i^c, P_j^d), \quad \text{(B.1)}$$

where:

$$f(P_i^c, P_j^d) = \log_2\left(1 + \frac{P_i^c g_{i,B}}{\sigma_N^2 + P_j^d h_{j,B}}\right) + \log_2\left(1 + \frac{P_j^d g_j}{\sigma_N^2 + P_i^c h_{i,j}}\right).$$

This means that at least one power of the optimum power pair $(P_i^{c*}, P_j^{d*})$ is limited by the maximum power constraint $P_{max}$.

1st Scenario $$\frac{P_{max} g_{i,B}}{\sigma_N^2 + P_{max} h_{j,B}} \leq \xi_{i,min}^c,$$

the admissible zone is shown in FIG. 4a. According to (B.1), the optimum power pair is located on the line CD. This means that the optimum power for the terminal $CU_i$, i.e. $P_i^{c*}$ is always $P_{max}$ and the optimum power for the pair $D2D_j$ satisfies:

$$\frac{(\sigma_N^2 + P_{max} h_{i,j})\xi_{j,min}^d}{g_j} \leq P_j^d \leq \frac{P_{max} g_{i,B} - \xi_{i,min}^c \sigma_N^2}{\xi_{i,min}^c h_{j,B}}. \quad \text{(B.2)}$$

In [4], it is also shown that $f(P_i^c, P_j^d)$ is a convex function over a variable $P_i^c$ or $P_j^d$ when the other variable $P_j^d$ or $P_i^c$ is set at a level $P_{max}$. This implies that the optimum pair of powers on the line CD is located at the end point C or D. Thus, the optimum power allocation for this scenario can be written as follows:

$$(P_i^{c*}, P_j^{d*}) = \arg\min_{(P_i^c, P_j^d) \in \mathcal{P}_1} f(P_i^c, P_j^d), \quad \text{(B.3)}$$

where:

$$\mathcal{P}_1\left\{\left(P_{max}, \frac{(\sigma_N^2 + P_{max} h_{i,j})\xi_{j,min}^d}{g_j}\right), \left(P_{max}, \frac{P_{max} g_{i,B} - \xi_{i,min}^c \sigma_N^2}{\xi_{i,min}^c h_{j,B}}\right)\right\}.$$

2nd Scenario $$\frac{P_{max} g_{i,B}}{\sigma_N^2 + P_{max} h_{j,B}} > \xi_{i,min}^c \text{ and } \frac{P_{max} g_j}{\sigma_N^2 + P_{max} h_{i,j}} \leq \xi_{j,min}^d,$$

the admissible zone is shown in FIG. 4b. According to (B.1), the optimum power pair is located on the line EF, so $P_j^d = P_{max}$. Since furthermore $f(P_i^c, P_{max})$ is a convex function of $P_i^c$, the optimum power pair is located at end point E or F. Consequently, the optimum power allocation for this scenario can be expressed as follows:

$$(P_i^{c*}, P_j^{d*}) = \arg\min_{(P_i^c, P_j^d) \in \mathcal{P}_2} f(P_i^c, P_j^d), \quad \text{(B.4)}$$

where:

$$\mathcal{P}_2\left\{\left(\frac{P_{max} g_j - \xi_{j,min}^d \sigma_N^2}{\xi_{j,min}^d h_{i,j}}, P_{max}\right), \left(\frac{(\sigma_N^2 + P_{max} h_{j,B})\xi_{i,min}^c}{g_{i,B}}, P_{max}\right)\right\}.$$

3rd Scenario $$\frac{P_{max} g_{i,B}}{\sigma_N^2 + P_{max} h_{j,B}} > \xi_{i,min}^c \text{ and } \frac{P_{max} g_j}{\sigma_N^2 + P_{max} h_{i,j}} \geq \xi_{j,min}^d,$$

the admissible zone is shown in FIG. 4c. In (B.1), the optimum power pair is located on the line CO or OF. When the pair is located on the line CO, on grounds similar to those of the first scenario, it can be found that the optimum power pair is located at point C or point O. When the pair is located on the line OF, on grounds similar to those of the second scenario, it can be found that the optimum power pair is located at the point O or the point F. Consequently, the optimum power allocation for this scenario may be expressed as follows:

$$(P_i^{c*}, P_j^{d*}) = \arg\max_{(P_i^c, P_j^d) \in \mathcal{P}_3} f(P_i^c, P_j^d), \quad \text{(B.5)}$$

where:

$$\mathcal{P}_3\left\{\left(P_{max}, \frac{(\sigma_N^2 + P_{max} h_{i,j})\xi_{j,min}^d}{g_j}\right), \right.$$

$$\left. (P_{max}, P_{max}), \left(\frac{(\sigma_N^2 + P_{max} h_{j,B})\xi_{i,min}^c}{g_{i,B}}, P_{max}\right)\right\}.$$

Although the present disclosure has been described with reference to one or more examples, workers skilled in the art will recognize that changes may be made in form and detail without departing from the scope of the disclosure and/or the appended claims.

The invention claimed is:

1. A communication method implemented by a base station of an access network in order to allocate spectrum resources among terminals (CU, D2D) identified by the station, the station having already allocated all of its spectrum resources to identified terminals $CU_i$ having communication set up via the base station, which terminals are said to be "served", the method comprising, for each pair $D2D_j$ of terminals that are candidates for direct communication:

verifying admissibility of the pair $D2D_j$ by determining a set $R_j$ of served terminals $CU_i$ that are candidates for sharing their respective spectrum resources with the pair $D2D_j$ under the sole constraint of the candidate terminal $CU_i$ and the pair $D2D_j$ satisfying their respective Quality of Service (QoS) criteria, the set $R_k$ being determined independently of determining a set $R_k$ of terminals $CU_i$ determined for any other pair $D2D_j$ of terminals that are candidates for direct communication other than the pair $D2D_j$, and repeating verifying admissibility for a plurality of terminal pairs $D2D_j$ that are candidates for direct communication.

2. The communication method according to claim 1, further comprising, for an admissible pair $D2D_j$ and for each terminal $CU_i$ of the set $R_j$ for said pair, determining a pair of transmission powers associated respectively with the terminal $CU_i$ and with the pair $D2D_j$ such that the pair of transmission powers maximizes the sum of the data rates for the terminal $CU_i$ and for the pair $D2D_j$.

3. The communication method according to claim 2, wherein the pair of transmission powers associated with the terminal $CU_i$ and the pair $D2D_j$ is given by the following system of equations:

$$(P_i^{c*}, P_j^{d*}) = \begin{cases} \arg\max_{(P_i^c, P_j^d) \in \mathcal{P}_1} f(P_i^c, P_j^d) & \text{if } \frac{P_{max}g_{i,B}}{\sigma_N^2 + P_{max}h_{j,B}} \leq \xi_{i,min}^c \text{ or} \\ \arg\max_{(P_i^c, P_j^d) \in \mathcal{P}_2} f(P_i^c, P_j^d), & \text{if } \frac{P_{max}g_{i,B}}{\sigma_N^2 + P_{max}h_{j,B}} > \xi_{i,min}^c \text{ and} \\ & \frac{P_{max}g_j}{\sigma_N^2 + P_{max}h_{i,j}} > \xi_{j,min}^d \text{ or} \\ \arg\max_{(P_i^c, P_j^d) \in \mathcal{P}_3} f(P_i^c, P_j^d), & \text{if } \frac{P_{max}g_{i,B}}{\sigma_N^2 + P_{max}h_{j,B}} > \xi_{i,min}^c \text{ and} \\ & \frac{P_{max}g_j}{\sigma_N^2 + P_{max}h_{i,j}} \geq \xi_{j,min}^d \end{cases}$$

with:

$$\mathcal{P}_1 = \{(P_{max}, P_1), (P_{max}, P_2)\},$$
$$\mathcal{P}_2 = \{(P_3, P_{max}), (P_4, P_{max})\},$$
$$\mathcal{P}_3 = \{(P_{max}, P_1), (P_{max}, P_{max}), (P_4, P_{max})\},$$
$$P_1 = \frac{(\sigma_N^2 + P_{max}h_{i,j})\xi_{j,min}^d}{g_j},$$
$$P_2 = \frac{P_{max}g_{i,B} - \xi_{i,min}^c \sigma_N^2}{\xi_{i,min}^c h_{j,B}},$$
$$P_3 = \frac{P_{max}g_j - \xi_{j,min}^d \sigma_N^2}{\xi_{j,min}^d h_{i,j}},$$
$$P_4 = \frac{(\sigma_N^2 + P_{max}h_{j,B})\xi_{i,min}^c}{g_{i,B}},$$

$f(P_i^c, P_j^d) = \log_2(1+\xi_i^c) + \log_2(1+\xi_j^d)$ is the function that sums the respective data rates of a candidate terminal $CU_i$ and the terminal pair $D2D_j$.

4. The communication method according to claim 1, wherein a terminal $CU_i$ forms part of the set $R_j$ if it satisfies the following system of equations:

$$\begin{cases} 0 \leq \frac{(g_j\xi_{i,min}^c + h_{j,B}\xi_{i,min}^c \xi_{j,min}^d)\sigma_N^2}{g_j g_{i,B} - \xi_{i,min}^c \xi_{j,min}^d h_{i,j}h_{j,B}} \leq P_{max}, \\ 0 \leq \frac{(h_{i,j}\xi_{i,min}^c \xi_{j,min}^d + g_{i,B}\xi_{j,min}^d)\sigma_N^2}{g_j g_{i,B} - \xi_{i,min}^c \xi_{j,min}^d h_{i,j}h_{j,B}} \leq P_{max}. \end{cases}$$

with:
$g_j$, the channel gain between the terminals of the pair $D2D_j$;
$g_{i,B}$, the channel gain between the terminal $CU_i$ and the base station over the uplink;
$h_{j,B}$, the channel gain of the interference link from the transmitter of the pair $D2D_j$ to the base station;
$h_{i,j}$, the channel gain of the interference link from a terminal $CU_i$ to the receiver of the pair $D2D_j$;
$\sigma_N$, the power of the additive Gaussian white noise on each channel;
$P_{max}$, the maximum transmission power of a terminal;
$\xi_{j,min}^d$ the minimum SINR level required by the pair $D2D_j$; and
$\xi_{i,min}^c$ the minimum SINR level required by a terminal $CU_i$.

5. The communication method according to claim 1, wherein a terminal $CU_i$ belongs to the set $R_j$ if its distance from the receiver terminal of the terminal pair $D2D_j$ is greater than or equal to the distance determined by the following system of equations:

$$L_{i,jRx}^{min} = \begin{cases} \left[\frac{K\xi_{i,min}^c \xi_{j,min}^d P_{max}}{(P_{max}g_{i,B} - \xi_{i,min}^c \sigma_N^2)\beta - \xi_{i,min}^c \xi_{j,min}^d \sigma_N^2}\right]^{\frac{1}{\alpha}} & \text{if } \frac{P_{max}g_{i,B}}{\sigma_N^2 + P_{max}h_{j,B}} \leq \xi_{i,min}^c \text{ or,} \\ \left[\frac{K\xi_{i,min}^c \xi_{j,min}^d (\sigma_N^2 + P_{max}h_{j,B})}{g_{i,B}(P_{max}g_j - \xi_{j,min}^d \sigma_N^2)}\right]^{\frac{1}{\alpha}} & \text{if } \frac{P_{max}g_{i,B}}{\sigma_N^2 + P_{max}h_{j,B}} > \xi_{i,min}^c, \end{cases}$$

with:

$$\beta = \frac{g_j}{h_{j,B}}$$

being the gain factor between the channel gain of the pair $D2D_j$ and the channel gain of the interference link from the transmitter of the pair $D2D_j$ to the base station;
$g_j$, the channel gain between the terminals of the pair $D2D_j$;
$g_{i,B}$, the channel gain between the terminal $CU_i$ and the base station over the uplink;
$h_{j,B}$, the channel gain of the interference link from the transmitter of the pair $D2D_j$ to the base station;
$h_{i,j}$, the channel gain of the interference link from a terminal $CU_i$ to the receiver of the pair $D2D_j$;
$\sigma_N$, the power of the additive Gaussian white noise on each channel;
$P_{max}$, the maximum transmission power of a terminal;
$\xi_{j,min}^d$ the minimum SINR level required by the pair $D2D_j$;
$\xi_{i,min}^c$ the minimum SINR level required by a terminal $CU_i$;
α propagation attenuation; and
K a constant determined by parameters of the access network.

6. The communication method according to claim 1, further including determining an optimum terminal from among a plurality of terminals $CU_i$ of a set $R_j$, the optimum terminal being the terminal that satisfies a local data rate improvement criterion, the local data rate improvement for a terminal of the set $R_j$ being determined by the difference between firstly the sum of the data rates obtained respectively by that terminal and the pair $D2D_j$ when that terminal is sharing its resource with that pair, and secondly the data rate obtained by that terminal when that terminal is not sharing its resource with that pair $D2D_j$.

7. The communication method according to claim 6, wherein admission verification is repeated for a plurality of terminal pairs D2D$_j$ that are candidates for direct communication, and wherein an optimum terminal is determined for all disjoint sets.

8. The communication method according to claim 1, further comprising for non-disjoint sets to determine jointly optimum terminals that make it possible to achieve a maximum increase in the local data rate by means of a weight optimization algorithm.

9. A base station of an access network, comprising:
means for allocating spectrum resources among terminals (CU, D2D) identified by the station, the station having already allocated all of its spectrum resources to identified terminals CU$_i$ having communication set up via the base station, which terminals are said to be "served"; and
means for verifying, for each pair D2D$_j$ of terminals that are candidates for direct communication, admissibility of the pair D2D$_j$ by determining a set R$_j$ of served terminals CU$_i$ that are candidates for sharing their respective spectrum resources with the pair D2D$_j$ under the sole constraint of the candidate terminal CU$_i$ and the pair D2D$_j$ satisfying their respective Quality of Service (QoS) criteria, the set R$_j$ being determined independently of determining a set R$_k$ of terminals CU$_i$ determined for any other pair D2D$_j$ of terminals that are candidates for direct communication other than the pair D2D$_j$ wherein admissibility verification is repeated for a plurality of terminal pairs D2D$_j$ that are candidates for direct communication.

10. An access network including at least one base station according to claim 9.

11. A non-transitory computer-readable data medium program instructions stored thereon adapted to performing a communication method by a base station of an access network when said program is loaded and executed by the base station for performing the communication method in order to allocate spectrum resources among terminals (CU, D2D) identified by the station, the station having already allocated all of its spectrum resources to identified terminals CU$_i$ having communication set up via the base station, which terminals are said to be "served", the method comprising, for each pair D2D$_j$ of terminals that are candidates for direct communication:
verifying admissibility of the pair D2D$_j$ by determining a set R$_j$ of served terminals CU$_i$ that are candidates for sharing their respective spectrum resources with the pair D2D$_j$ under the sole constraint of the candidate terminal CU$_i$ and the pair D2D$_j$ satisfying their respective Quality of Service (QoS) criteria, the set R$_j$ being determined independently of determining a set R$_k$ of terminals CU$_i$ determined for any other pair D2D$_j$ of terminals that are candidates for direct communication other than the pair D2D$_j$, and
repeating verifying admissibility for a plurality of terminal pairs D2D$_j$ that are candidates for direct communication.

12. A communication method implemented by a base station of an access network in order to allocate spectrum resources among terminals (CU, D2D) identified by the station, the station having already allocated all of its spectrum resources to identified terminals CU$_i$ having communication set up via the base station, which terminals are said to be "served", the method comprising, for each pair D2D$_j$ of terminals that are candidates for direct communication:
verifying admissibility of the pair D2D$_j$ by determining a set R$_j$ of served terminals CU$_i$ that are candidates for sharing their respective spectrum resources with the pair D2D$_j$ under the sole constraint of the candidate terminal CU$_i$ and the pair D2D$_j$ satisfying their respective Quality of Service (QoS) criteria, the set R$_j$ being determined independently of determining a set R$_k$ of terminals CU$_i$ determined for any other pair D2D$_j$ of terminals that are candidates for direct communication other than the pair D2D$_j$,
wherein a terminal CU$_i$ forms part of the set R$_j$ if it satisfies the following system of equations:

$$\begin{cases} 0 \leq \dfrac{(g_j \xi_{i,min}^c + h_{j,B} \xi_{i,min}^c \xi_{j,min}^d)\sigma_N^2}{g_j g_{i,B} - \xi_{i,min}^c \xi_{j,min}^d h_{i,j} h_{j,B}} \leq P_{max}, \\ 0 \leq \dfrac{(h_{i,j} \xi_{i,min}^c \xi_{j,min}^d + g_{i,B} \xi_{j,min}^d)\sigma_N^2}{g_j g_{i,B} - \xi_{i,min}^c \xi_{j,min}^d h_{i,j} h_{j,B}} \leq P_{max}. \end{cases}$$

with:
g$_j$, the channel gain between the terminals of the pair D2D$_j$;
g$_{i,B}$, the channel gain between the terminal CU$_i$ and the base station over the uplink;
h$_{j,B}$, the channel gain of the interference link from the transmitter of the pair D2D$_j$ to the base station;
h$_{i,j}$, the channel gain of the interference link from a terminal CU$_i$ to the receiver of the pair D2D$_j$;
σ$_N$, the power of the additive Gaussian white noise on each channel;
P$_{max}$, the maximum transmission power of a terminal;
ξ$_{j,min}^d$ the minimum SINR level required by the pair D2D$_j$; and
ξ$_{i,min}^c$ the minimum SINR level required by a terminal CU$_i$.

* * * * *